(12) United States Patent
Kiyota (10) Patent No.: US 9,093,216 B2
(45) Date of Patent: Jul. 28, 2015

(54) NON-CONTACT POWER TRANSMISSION APPARATUS

(75) Inventor: Atsushi Kiyota, Kawasaki (JP)

(73) Assignee: NEC Casio Mobile Communications, Ltd., Kawasaki-shi, Kanagawa (JP)

( * ) Notice: Subject to any disclaimer, the term of this patent is extended or adjusted under 35 U.S.C. 154(b) by 317 days.

(21) Appl. No.: 13/823,719

(22) PCT Filed: Sep. 14, 2011

(86) PCT No.: PCT/JP2011/070957
§ 371 (c)(1),
(2), (4) Date: Mar. 14, 2013

(87) PCT Pub. No.: WO2012/036192
PCT Pub. Date: Mar. 22, 2012

(65) Prior Publication Data
US 2013/0175876 A1    Jul. 11, 2013

(30) Foreign Application Priority Data

Sep. 16, 2010 (JP) ................................. 2010-207822

(51) Int. Cl.
*H01F 38/14* (2006.01)
*H02J 5/00* (2006.01)
*H01F 27/36* (2006.01)

(52) U.S. Cl.
CPC ................ *H01F 38/14* (2013.01); *H02J 5/005* (2013.01); *H01F 27/365* (2013.01)

(58) Field of Classification Search
CPC ... H01F 27/2871; H01F 27/365; H01F 38/14; H02J 5/005
USPC .......... 307/104, 116, 149; 320/107, 108, 114; 336/200
See application file for complete search history.

(56) References Cited

U.S. PATENT DOCUMENTS

2009/0021212 A1   1/2009   Hasegawa et al.
2010/0007215 A1   1/2010   Sakuma

FOREIGN PATENT DOCUMENTS

CN   101272063 A   9/2008
CN   101404203 A   4/2009
(Continued)

OTHER PUBLICATIONS

International Search Report dated Dec. 13, 2011 with English translation thereof.
(Continued)

*Primary Examiner* — Rexford Barnie
*Assistant Examiner* — Thai Tran
(74) *Attorney, Agent, or Firm* — McGinn IP Law Group, PLLC (57) ABSTRACT

Provided is a non-contact power transmission apparatus that can be made thinner without any drop in power transmission efficiency.
The non-contact power transmission apparatus includes: primary coil (2) generating a magnetic flux ($\Phi 1$); secondary coil (4) disposed facing primary coil (2) to receive power in a non-contact manner from primary coil (2) by electromagnetic induction; magnetic-substance layer (5) that covers a side opposite the side of secondary coil (4) facing primary coil (2) so that the magnetic flux ($\Phi 1$) can pass; magnet portion (7) disposed to be able to switch two magnetic poles and configured to generate a magnetic flux ($\Phi 2$) that is larger than the difference between the maximum value of the first magnetic flux ($\Phi 1$) and the saturated magnetic flux of magnetic-substance layer (5) and that passes through magnetic-substance layer (5) in a direction in which magnetic-substance layer (5) spreads; and magnetic pole switching unit (8) that detects the direction of the first magnetic flux ($\Phi 1$), and switches the magnetic pole of magnet portion (7) to generate a magnetic flux ($\Phi 2$) in a direction opposite the direction of the first magnetic flux ($\Phi 1$).

4 Claims, 6 Drawing Sheets

(56) References Cited

FOREIGN PATENT DOCUMENTS

| | | | |
|---|---|---|---|
| CN | 101836272 A | 9/2010 |
| JP | 63-273307 A | 11/1988 |
| JP | 08-126230 A | 5/1996 |
| JP | 2000-201442 A | 7/2000 |
| JP | 2003-217950 A | 7/2003 |
| JP | 2004-047700 A | 2/2004 |
| JP | 2009-004513 A | 1/2009 |
| JP | 2009-027025 A | 2/2009 |
| JP | 2010-041906 A | 2/2010 |

OTHER PUBLICATIONS

Chinese Office Action dated Feb. 28, 2015 with an English Translation thereof.

NON-CONTACT POWER TRANSMISSION APPARATUS

TECHNICAL FIELD

The present invention relates to a non-contact power transmission apparatus that transmits power in a non-contact manner. More particularly, the invention relates to a non-contact power transmission apparatus that can be miniaturized and made thin.

BACKGROUND ART

Recently, in portable electronic devices such as a portable telephone or an electronic information terminal, a secondary battery that can be discharged or charged, e.g., a lithium ion battery or a nickel hydride battery, is frequently used. The portable electronic device using the secondary battery includes a charging terminal in its body. The secondary battery is charged by connecting the terminal to a charger.

The portable electronic device is ordinarily held near a user to be always ready for use. Accordingly, when the charging terminal is exposed from the body of the portable electronic device, there is a possibility that the user will touch the charging terminal and receive an electric shock. There is also a possibility that metal will touch the charging terminal to cause short-circuiting of the portable electronic device. Recently, therefore, there has been offered a non-contact power transmission apparatus that can charge the portable electronic device in a non-contact manner without using any charging terminal.

As the non-contact power transmission apparatus, there is known a non-contact power transmission device of an electromagnetic induction type in which a charger includes a primary coil for power transmission and a portable electronic device includes a secondary coil for power reception. Power can be transmitted in non-contact by supplying current to the primary coil to generate a magnetic flux and causing the secondary coil to generate an induced electromotive force by the magnetic flux.

However, in the non-contact power transmission device of the electromagnetic induction type, when there is any metal component around the primary coil or the secondary coil, the magnetic flux generated at the primary coil may leak to the metal component. The leakage of the magnetic flux to the metal component creates problems of not only a drop in power transmission efficiency but also heat generation at the metal component.

Figure 1:
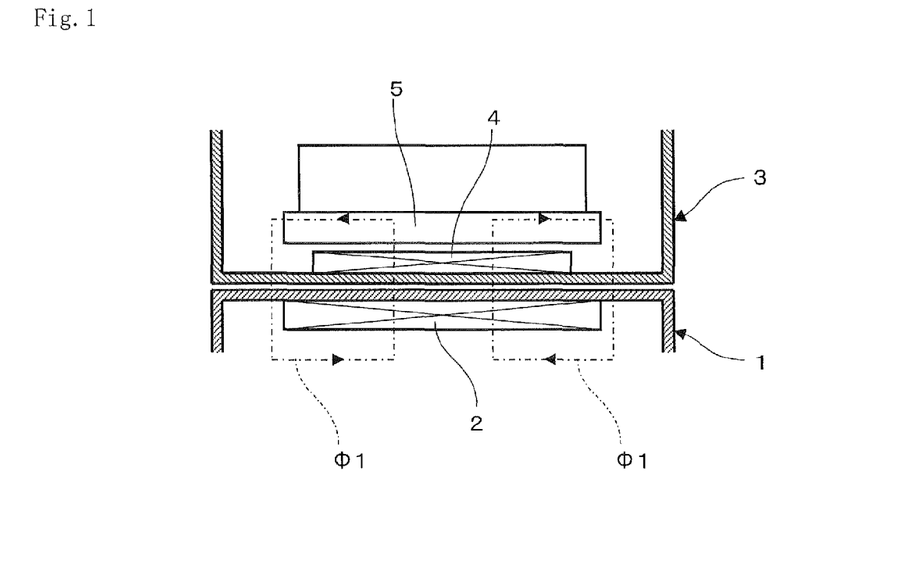
FIG. 1 is a schematic view showing a non-contact power transmission device disclosed in Patent Literature 1.

Particularly, in a portable electronic device required to be miniaturized and made thin, a secondary coil and a metal component are arranged closer, and more magnetic fluxes easily leak due to the metal component. Thus, JP2000-201442A (Patent Literature 1) discloses a non-contact power transmission device that can prevent leakage of a magnetic flux to a metal component. FIG. 1 schematically shows the non-contact power transmission device disclosed in Patent Literature 1.

As shown in FIG. 1, the non-contact power transmission device includes primary coil 2 disposed in charger 1 and secondary coil 4 disposed in portable electronic device 3. Primary coil 2 and secondary coil 4 are arranged to face each other when portable electronic device 3 is mounted on charger 1. Primary coil 2 receives current to generate a magnetic flux $\Phi 1$. By supplying the current to primary coil 2 in the mounted state of portable electronic device 3 on charger 1, the magnitude of the magnetic flux $\Phi 1$ applied on secondary coil 4 is greatly changed. As a result, an induced electromotive force is generated at secondary coil 4, and power is transmitted from primary coil 2 to secondary coil 4 in non-contact.

The non-contact power transmission device disclosed in Patent Literature 1 further includes magnetic-substance layer 5 disposed to cover a surface opposite the surface of secondary coil 4 facing primary coil 2. Since magnetic flux $\Phi 1$ passes through magnetic-substance layer 5, leakage of magnetic flux $\Phi 1$ to the metal component around the non-contact power transmission device can be reduced. As a result, a drop in power transmission efficiency and heat generation at the metal component can be prevented.

However, when magnetic flux $\Phi 1$ of a size equal to or larger than an acceptable range is applied to magnetic-substance layer 5, magnetic saturation occurs at magnetic-substance layer 5. The magnetic saturation causes leakage of magnetic flux $\Phi 1$ from magnetic-substance layer 5 to the metal component disposed around metal-substance layer 5, creating a possibility that the power transmission efficiency will drop and heat will be generated at the metal component. Thus, in the non-contact power transmission device disclosed in Patent Literature 1, the magnitude of magnetic flux $\Phi 1$ is limited to prevent magnetic saturation at magnetic-substance layer 5.

A factor for determining the magnitude (hereinafter, "saturated magnetic flux") of magnetic flux $\Phi 1$ causing magnetic saturation at magnetic-substance layer 5 is the thickness of magnetic-substance layer 5. The saturated magnetic flux at magnetic-substance layer 5 can be enlarged by forming magnetic-substance layer 5 thick in a direction perpendicular to that of the magnetic flux $\Phi 1$ passed through magnetic-substance layer 5. However, thicker magnetic-substance layer 5 leads to enlargement of the non-contact power transmission apparatus, causing enlargement of portable electronic device 3.

To prevent magnetic saturation at magnetic-substance layer 5, the current supplied to primary coil 2 can be reduced to increase the magnitude of magnetic flux $\Phi 1$. However, this causes a drop in amount (hereinafter, "power transmission efficiency") of power transmitted per unit time. The drop in power transmission efficiency necessitates longer time for charging portable electronic device 3.

CITATION LIST

Patent Literature 1: JP2000-201442A

SUMMARY OF INVENTION

It is therefore an object of the present invention to provide a non-contact power transmission apparatus that can be made thinner without any drop in power transmission efficiency.
Solution to Problem To achieve the object, according to an aspect of the present invention, a non-contact power transmission apparatus includes a primary coil, a secondary coil, a magnetic-substance layer, a magnet portion, and a magnetic pole switching unit. The primary coil generates a magnetic flux. The secondary coil is disposed facing the primary coil to receive power in a non-contact manner from the primary coil by electromagnetic induction so that the magnetic flux of the primary coil can pass through the coil. The magnetic-substance layer is disposed to cover a side opposite the side of the secondary coil facing the primary coil so that the magnetic flux of the primary coil that passed through the secondary coil can pass. The magnet portion is disposed to be able to switch two magnetic poles. The magnet portion is also configured to generate a magnetic flux that is larger than a difference between the maximum value of the first magnetic flux generated at the primary coil and the saturated magnetic flux of the magnetic-substance layer and passes through the magnetic-substance layer in a direction in which the magnetic-substance layer spreads. The magnetic pole switching unit detects the direction of the magnetic flux generated at the primary coil, and switches the magnetic pole of the magnet portion to generate a magnetic flux in a direction opposite the direction of the magnetic flux.

According to the present invention, the non-contact power transmission apparatus can be made thinner without any drop in power transmission efficiency.

DESCRIPTION OF EXEMPLARY EMBODIMENT

Hereinafter, a non-contact power transmission apparatus according to the exemplary embodiment of the present invention will be described with reference to the drawings.

Figure 2:
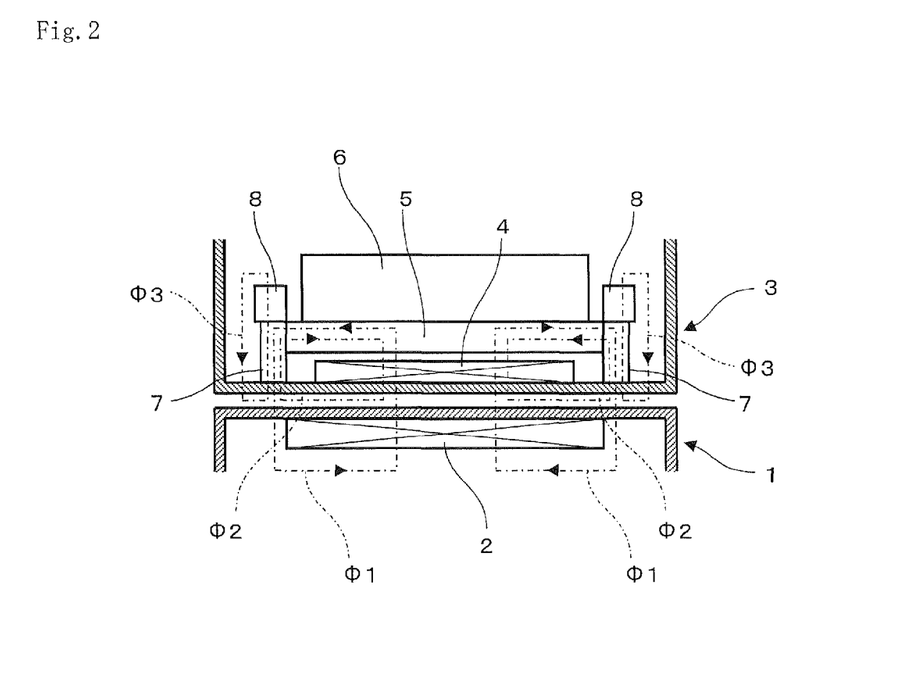
FIG. 2 is a partial schematic view showing a charger and a portable electronic device in a non-contact power transmission apparatus according to the exemplary embodiment of the present invention.

FIG. 2 is a partial schematic view showing a charger and a portable electronic device in a non-contact power transmission apparatus according to the exemplary embodiment of the present invention. FIG. 2 shows a state where the portable electronic device is mounted on the charger to be chargeable.

As shown in FIG. 2, the non-contact power transmission apparatus includes primary coil 2 disposed for power transmission in charger 1, and secondary coil 4 disposed for power reception in portable electronic device 3. Each of primary coil 2 and secondary coil 4 has an arbitrary surface surrounded with a conductor. Primary coil 2 and secondary coil 4 are arranged so that the arbitrary surfaces can face each other when portable electronic device 3 is mounted on charger 1.

Primary coil 2 is electrically connected to an AC power supply source (not shown). A magnetic flux $\Phi 1$ is generated around primary coil 2 by supplying current to primary coil 2. The magnetic flux $\Phi 1$ is generated to circulate through the annular inner and outer sides of primary coil 2. The magnetic flux $\Phi 1$ passes through secondary coil 4. The magnitude of the magnetic flux $\Phi 1$ that penetrates the arbitrary surface of secondary coil 4 that is surrounded with the conductor changes to generate an induced electromotive force at secondary coil 4.

Secondary coil 4 is electrically connected to battery pack 6 that can store power. The power is stored in battery pack 6 by an induced electromotive force generated at secondary coil 4. In other words, battery pack 6 is charged by transmitting power from primary coil 2 to secondary coil 4 in non-contact.

The non-contact power transmission apparatus includes magnetic-substance layer 5 formed into a sheet shape. The sheet surface of magnetic-substance layer 5 covers a side opposite the side of secondary coil 4 facing primary coil 2. By forming magnetic-substance layer 5 thin, the size of portable electronic device 3 can be reduced in the thickness direction of magnetic-substance layer 5.

Magnetic-substance layer 5 contains an easily magnetized substance. Accordingly, magnetic flux $\Phi 1$ generated at primary coil 2 passes through magnetic-substance layer 5 to circulate through the annular inner and outer sides of primary coil 2 until magnetic saturation occurs at magnetic-substance layer 5. Even when a metal component such as battery pack 6 is disposed close to magnetic-substance layer 5, leakage of the magnetic flux $\Phi 1$ to the metal component can be prevented, and heat generation at the metal component and a drop in power transmission efficiency can be prevented. Thus, the metal component can be disposed close to magnetic-substance layer 5, namely, the non-contact power transmission apparatus, and portable electronic device 3 can be miniaturized more.

The non-contact power transmission apparatus according to the exemplary embodiment includes magnet portion 7 having magnetic poles and configured to apply a magnetic bias to magnetic-substance layer 5. Magnet portion 7 is found able to switch two magnetic poles, in other words, reverse a N pole and a S pole. When the magnetic poles are reversed, the direction of magnetic flux $\Phi 2$ generated around magnet portion 7 is also reversed. The magnetic flux $\Phi 2$ is larger than the difference between the maximum value of magnetic flux $\Phi 1$ at primary coil 2 and the saturated magnetic flux of magnetic-substance layer 5.

One magnetic pole of magnet portion 7 is located on the extension of a direction in which magnetic-substance layer 5 spreads. The other magnetic pole of magnet portion 7 is disposed so that a line connecting the two magnetic poles of magnet portion 7 can roughly perpendicularly cross the direction. Thus, the magnetic flux $\Phi 2$ generated around magnet portion 7 passes through the inside of magnetic-substance layer 5 in the direction in which magnetic-substance layer 5 spreads. In other words, the magnetic flux $\Phi 2$ partially has the same path as that of magnetic flux $\Phi 1$.

Figure 3:
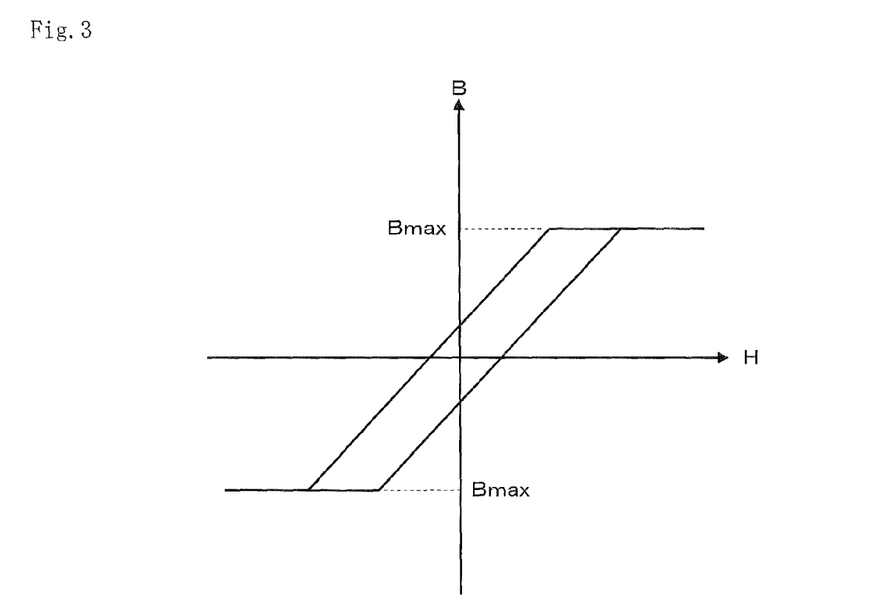
FIG. 3 is a view showing a B-H curve indicating magnetic characteristics of the magnetic-substance layer shown in FIG. 2.

Next, the magnetic characteristics of magnetic-substance layer 5 will be described. FIG. 3 schematically shows the magnetic characteristics (generally, B-H curve) of magnetic-substance layer 5, a horizontal axis indicating magnetic field H and a vertical axis indicating magnetic flux density B. The direction of a magnetic flux applied in one of directions parallel to the sheet surface of magnetic-substance layer 5 is a positive direction, while the direction of a magnetic flux applied in a direction opposite the positive direction is a negative direction.

As shown in FIG. 3, magnetic-substance layer 5 has a saturated magnetic flux density Bmax. When a magnetic flux equal or higher than the saturated magnetic flux density Bmax is applied to magnetic-substance layer 5, magnetic saturation occurs at magnetic-substance layer 5, and the magnetic flux leaks from magnetic-substance layer 5.

Figure 4:
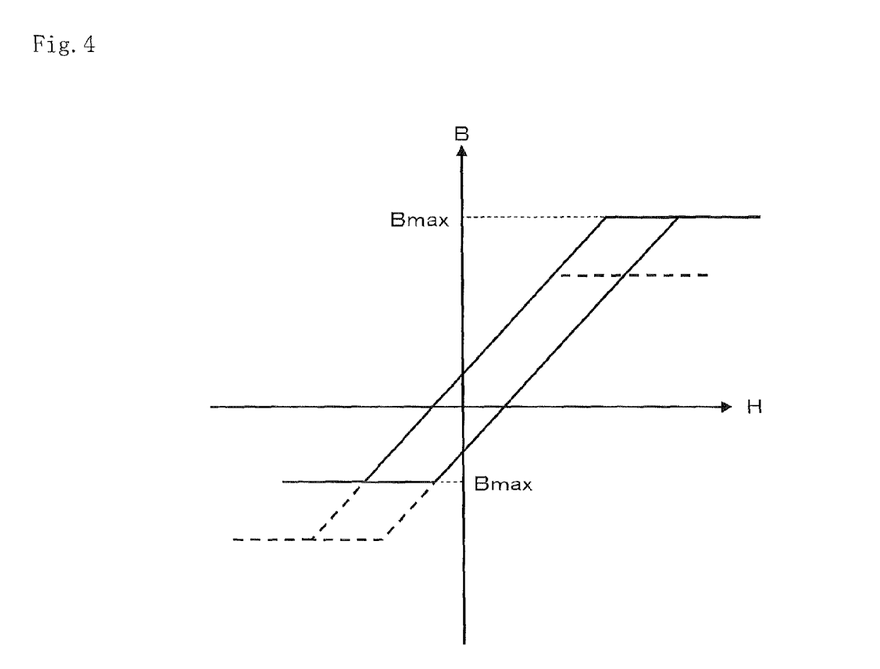
FIG. 4 is a view showing a B-H curve indicating magnetic characteristics of the magnetic-substance layer in a state where a magnetic bias of a negative direction is applied to the magnetic-substance layer.
Figure 5:
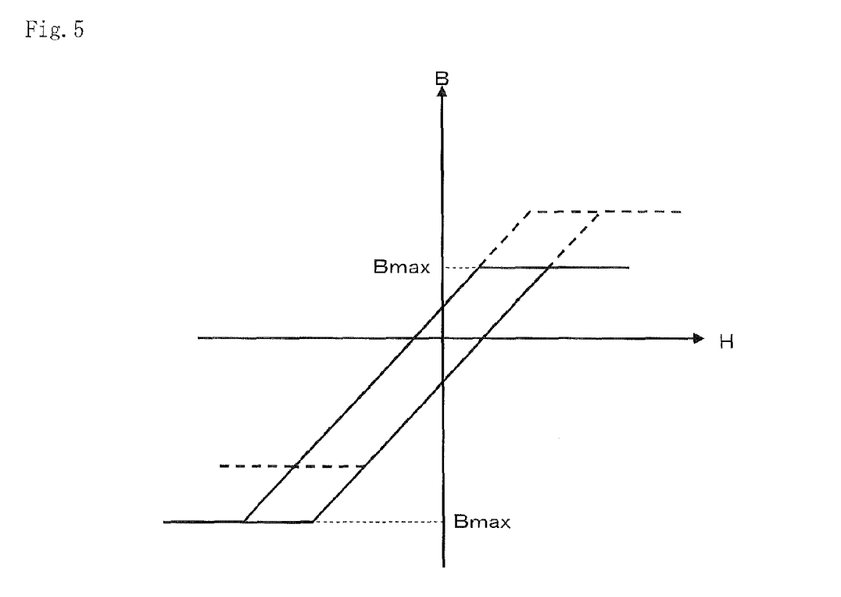
FIG. 5 is a view showing a B-H curve indicating magnetic characteristics of the magnetic-substance layer in a state where a magnetic bias of a positive direction is applied to the magnetic-substance layer.

FIG. 4 is a view showing a B-H curve indicating the magnetic characteristics of magnetic-substance layer 5 in a state where a magnetic bias of a negative direction is applied to magnetic-substance layer 5. FIG. 5 is a view showing a B-H curve indicating the magnetic characteristics of magnetic-substance layer 5 in a state where a magnetic bias of a positive direction is applied to magnetic-substance layer 5. Chain lines shown in FIGS. 4 and 5 are B-H curves indicating the magnetic characteristics of magnetic-substance layer 5 in a state where no magnetic bias is applied.

As shown in FIG. 4, by applying the magnetic flux of the negative direction to magnetic-substance layer 5, the saturated magnetic flux density Bmax in the positive direction is increased. Accordingly, even when a larger magnetic flux of a positive direction is applied to magnetic-substance layer 5, no magnetic saturation occurs at magnetic-substance layer 5. As shown in FIG. 5, by applying the magnetic flux of the positive direction to magnetic-substance layer 5, even when a larger magnetic flux of a negative direction is applied to magnetic-substance layer 5, no magnetic saturation occurs at magnetic-substance layer 5.

In other words, by applying a magnetic bias of a direction opposite the direction of the magnetic flux $\Phi 1$ that is applied to magnetic-substance layer 5, even when larger magnetic flux $\Phi 1$ is applied to magnetic-substance layer 5, no magnetic saturation occurs at magnetic-substance layer 5. Thus, no magnetic flux leaks from magnetic-substance layer 5.

In the non-contact power transmission apparatus according to the exemplary embodiment, as shown in FIG. 2, magnet portion 7 is disposed so that one magnetic pole of magnet portion 7 can come into contact with the end of magnetic-substance layer 5. Since magnetic flux 12 by magnet portion 7 passes through magnetic-substance layer 5 along the sheet surface of magnetic-substance layer 5, the magnetic flux $\Phi 2$ is a magnetic bias to magnetic-substance layer 5.

By applying magnetic flux $\Phi 2$ in the direction opposite magnetic flux $\Phi 1$, the saturated magnetic flux density Bmax (FIG. 3 or FIG. 5) of magnetic-substance layer 5 can be increased. This enables thinning of magnetic-substance layer 5, and thus the non-contact power transmission apparatus can be miniaturized more and made thinner.

The non-contact power transmission apparatus includes magnetic pole switching unit 8 that switches the magnetic poles of magnet portion 7. Magnetic pole switching unit 8 can detect the direction of magnetic flux $\Phi 1$ generated at primary coil 2, and switch the magnetic poles of magnet portion 7 according to the direction of magnetic flux $\Phi 1$.

Thus, the direction of magnetic flux $\Phi 2$ by magnet portion 7 can be changed according to the direction of magnetic flux $\Phi 1$ generated at primary coil 2. In other words, even when the direction of the current supplied to primary coil 2 by the AC current supply source is changed to change the direction of magnetic flux $\Phi 1$, the magnetic bias of the direction opposite that of the magnetic flux $\Phi 1$ can be applied to magnetic-substance layer 5.

Figure 6:
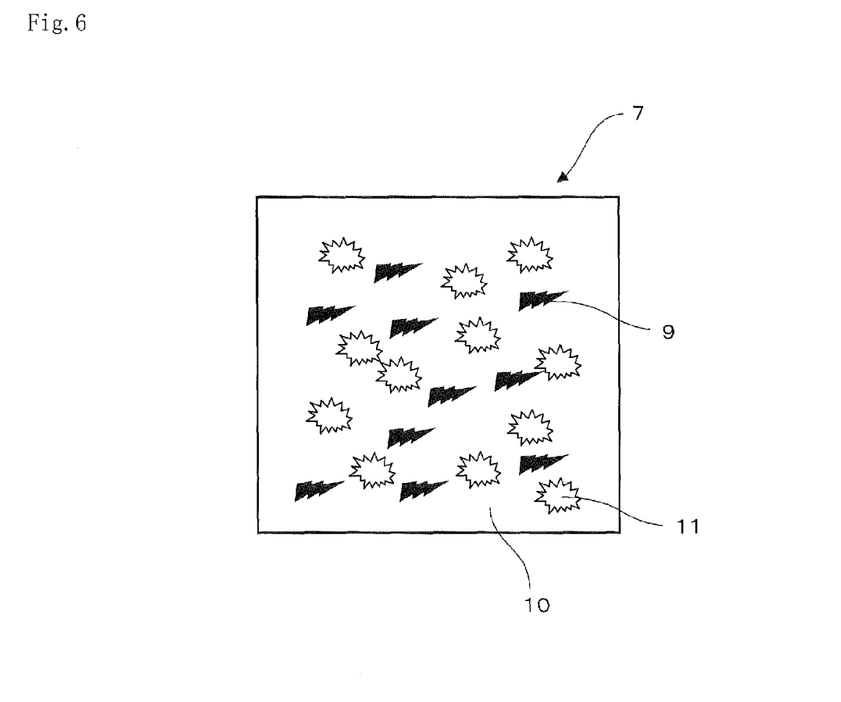
FIG. 6 is a schematic view showing a configuration of a magnet portion shown in FIG. 2.
Figure 7:
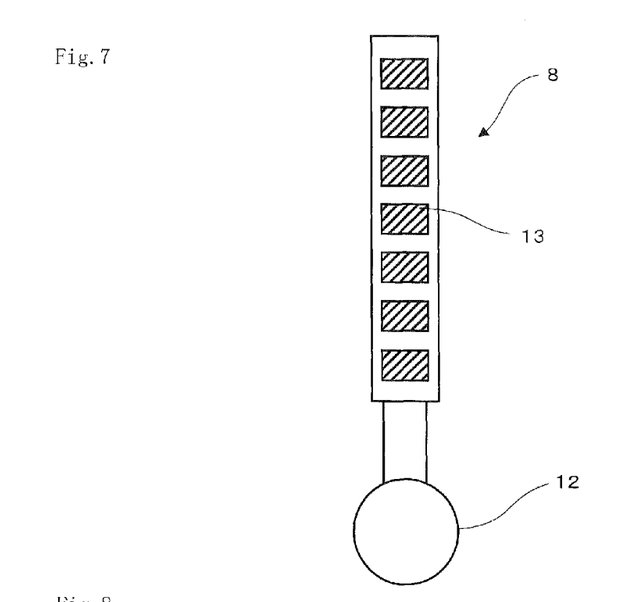
FIG. 7 is a schematic view showing a configuration of a magnetic pole switching unit shown in FIG. 2.

Referring to FIGS. 6 and 7, the configuration examples of magnet portion 7 and magnetic pole switching unit 8 will be described in detail.

FIG. 6 is a schematic view showing a configuration of magnet portion 7. As shown in FIG. 6, magnet portion 7 is made of resin material 10 containing powdered magnet 9. As powdered magnet 9, a rare-earth magnet such as a neodymium magnet or a samarium-cobalt magnet can be used. Needless to say, the present invention is not limited to these magnets. Any magnet can be used as long as a magnetic force remains for a relatively long time.

Resin material 10 has enough viscosity to keep magnet 9 in a static state when no magnetic force is received from the outside, and enable magnet 9 to rotate when a magnetic force is received from the outside.

Thus, when a magnetic flux of a predetermined direction is applied to magnet portion 7, each magnet 9 rotates so that the N pole of magnet 9 can face the direction of the magnetic flux. Then, when the magnetic flux applied to magnet portion 7 is released, since magnet 9 is kept in the static state by resin material 10, the side of magnet portion 7 facing the direction of the magnetic flux applied to magnet portion 7 is a N pole, and a side opposite the direction of the magnetic flux is a S pole.

For example, when a magnetic force of a direction from an upper side to a lower side on a paper surface is applied to magnet portion 7 and then released, the upper side of magnet portion 7 on the paper surface is a S pole, and the lower side of magnet portion 7 is a N pole.

Magnet portion 7 includes soft magnetic member 11. This facilitates passage of the magnetic flux $\Phi 1$ (FIG. 2) generated at primary coil 2 through magnet portion 7.

FIG. 7 is a schematic view showing the configuration of magnetic pole switching unit 8. As shown in FIG. 7, magnetic pole switching unit 8 includes magnetic flux direction detection coil 12 for detecting the direction of the magnetic flux $\Phi 1$ (FIG. 2) generated at primary coil 2, and electromagnet 13 energized to generate a magnetic force. The generation of the magnetic force by electromagnet 13 is accompanied by the generation of a magnetic flux $\Phi 3$ (FIG. 2) by magnetic pole switching unit 8.

Referring to FIGS. 2, 6, and 7, the detection of the direction of magnetic flux $\Phi 1$ generated at primary coil 2, the current that is supplied to electromagnet 13, and the switching of the magnetic poles of magnet portion 7 by magnetic pole switching unit 8 will be described. Magnetic flux direction detection coil 12 is disposed in portable electronic device 3 so that the magnetic flux $\Phi 1$ generated at primary coil 2 can be received to generate an induced electromagnetic force in magnetic flux direction detection coil 12. The direction of the magnetic flux $\Phi 1$ generated at primary coil 2 can be detected from the direction of the induced electromagnetic force in magnetic flux direction detection coil 12.

To prevent magnetic flux direction detection coil 12 from erroneously detecting the direction of current supplied to primary coil 2, a magnetic flux generation coil for generating a magnetic flux toward magnetic flux direction detection coil 12 can be separately disposed on charger 1 side. The magnetic flux generation coil generates a magnetic flux in a predetermined direction according to the direction of the current supplied to primary coil 2, namely, the direction of magnetic flux $\Phi 1$ generated at primary coil 2.

By disposing magnetic flux direction detection coil 12 in a position where the magnetic flux generation coil and magnetic flux direction detection coil 12 are not affected by magnetic fluxes $\Phi 2$ and $\Phi 3$ generated at magnet portion 7 and electromagnet 13, erroneous detection of the direction of the magnetic flux $\Phi 1$ generated at primary coil 2 can be prevented.

In the present exemplary embodiment, magnetic flux direction detection coil 12 is used. However, as means for detecting the direction of the magnetic flux Φ1 generated at primary coil 2, other known means can be used.

Magnetic flux direction detection coil 12 is electrically connected to electromagnet 13, and current is supplied to electromagnet 13 by an induced electromotive force generated at magnetic flux direction detection coil 12. A current supply source (not shown) can be disposed between magnetic flux direction detection coil 12 and electromagnet 13 to supply the current of a predetermined direction to electromagnet 13 according to the flowing direction of current generated at magnetic flux direction detection coil 12, namely, the direction of current supplied to primary coil 2.

By supplying the current to electromagnet 13, a magnetic force is generated at electromagnet 13, a part of magnetic pole switching unit 8 is set to a N pole, and the place of magnetic pole switching unit 8 opposite the N pole is set to a S pole. As a result, a magnetic flux Φ3 is generated around magnetic pole switching unit 8. The direction of the magnetic flux Φ3 generated around magnetic pole switching unit 8 is determined by the winding direction of a coil constituting electromagnet 13 or the direction of the current supplied to electromagnet 13.

The part of magnetic pole switching unit 8 set to the N pole or the S pole is in contact with one magnetic pole of magnet portion 7. When the part of magnetic pole switching unit 8 in contact with one magnetic pole of magnet portion 7 is set to the N pole, magnet 9 rotates so that the part of magnet portion 7 can be set to the S pole. When the part of magnetic pole switching unit 8 is set to the S pole, magnet 9 rotates so that the part of magnet portion 7 can be set to the N pole.

The inclusion of soft magnetic member 11 in magnet portion 7 facilitates passage of magnetic flux 13 generated at magnetic pole switching unit 8 through magnetic portion 7. Thus, magnet 9 is easily affected by magnetic flux Φ3 generated at magnetic pole switching unit 8, and the magnetic pole of magnet portion 7 is easily switched.

Magnetic pole switching unit 8 stops the supplying of the current to electromagnet 13 when the magnetic pole of magnet portion 7 is switched, and magnetic flux Φ3 disappears. After magnetic flux Φ3 has disappeared, magnet portion 7 is not affected any more by the magnetic flux Φ3. A magnetic flux Φ2 is generated to pass through magnetic-substance layer 5. Since magnet 9 of magnet portion 7 is kept in the static state by resin material 10, even after the magnetic flux Φ3 has disappeared, the magnetic pole of magnet portion 7 is maintained.

Figure 8:
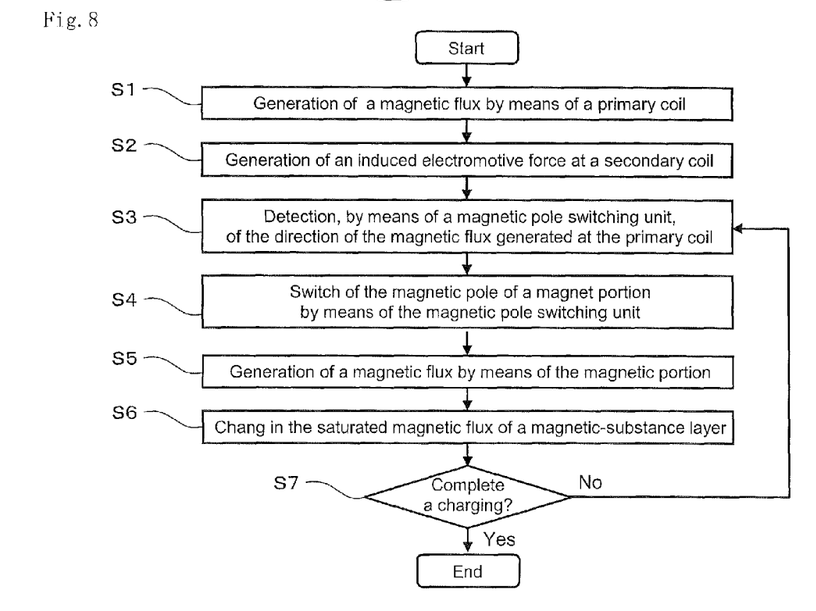
FIG. 8 is a time chart showing the operation of the non-contact power transmission device according to the exemplary embodiment.
Figure 9A:
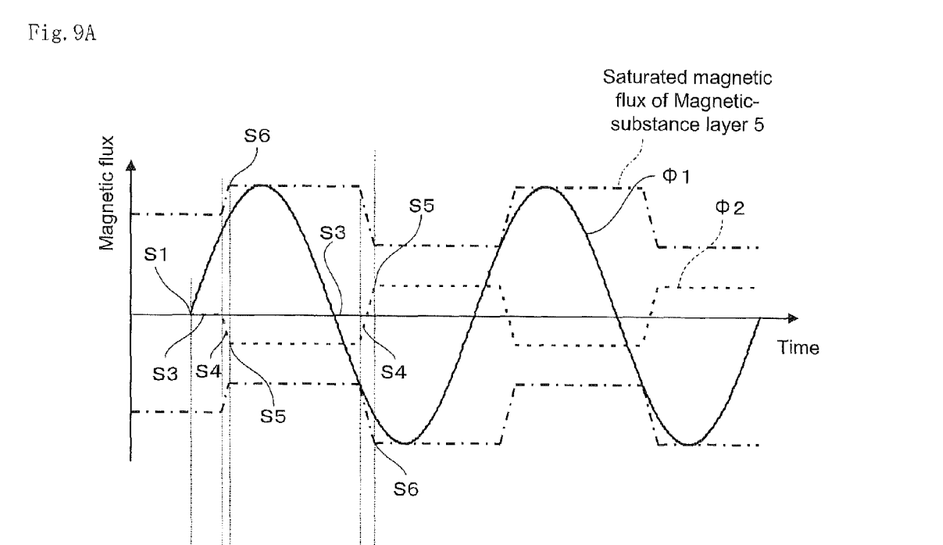
FIGS. 9A and 9B are Graphs showing changes with time of magnetic flux generated at a primary coil, a magnetic flux generated at the magnet portion, a saturated magnetic flux at the magnetic-substance layer, and an induced electromotive force generated at a secondary coil.
Figure 9B:
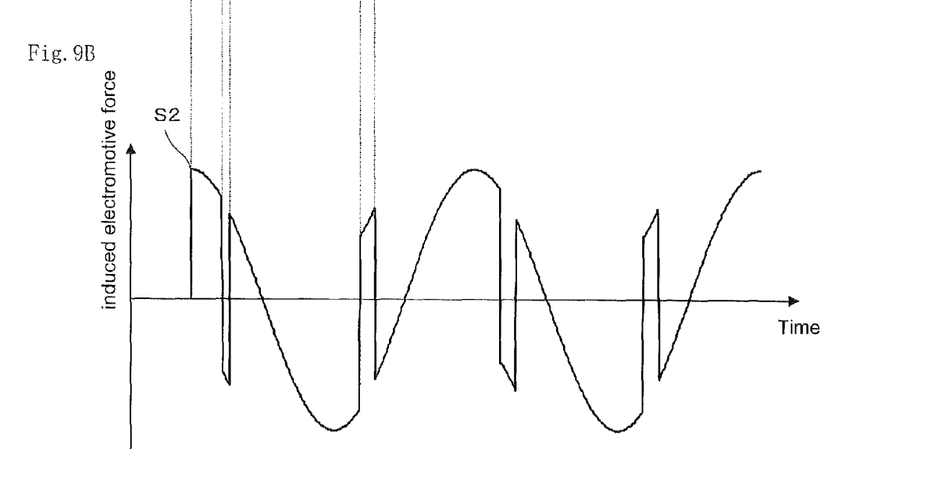

Next, referring to FIGS. 2, 8, 9A, and 9B, the operation of the non-contact power transmission apparatus according to the exemplary embodiment will be described. FIG. 8 is a time chart showing the operation of the non-contact power transmission apparatus according to the exemplary embodiment. FIG. 9A is a graph showing changes with time of the magnetic flux Φ1 generated at primary coil 2, magnetic flux Φ2 generated at magnet portion 7, and the saturated magnetic flux at magnetic-substance layer 5. In FIG. 9A, a solid line indicates magnetic flux Φ1, and a chain line indicates magnetic flux Φ2. A chain double dashed line indicates the saturated magnetic flux at magnetic-substance layer 5. FIG. 9B is a graph showing a change with time of the induced electromotive force generated at secondary coil 4.

As shown in FIGS. 8, 9A, and 9B, when the operation of the non-contact power transmission apparatus is started, AC current is supplied to primary coil 2 to generate magnetic flux Φ1 (step S1). The magnetic flux Φ1 passes through an arbitrary surface of secondary coil 4 surrounded with the conductor.

Since the current supplied to primary coil 2 is AC, the magnitude of the magnetic flux Φ1 also changes. The magnitude change of the magnetic flux Φ1 is accompanied by generation of an induced electromotive force at secondary coil 4 (step S2). The magnitude of the induced electromotive force at secondary coil 4 is proportional to the change per unit time of the magnitude of magnetic flux Φ1 put through secondary coil 4 (Faraday's law of electromagnetic induction).

When the magnetic flux Φ1 is generated, magnetic pole switching unit 8 detects the direction of the magnetic flux Φ1 generated at primary coil 2 (step S3), and switches the magnetic pole of magnet portion 7 in a predetermined direction (step S4). A magnetic flux Φ2 is generated from magnet portion 7 the magnetic pole of which has been switched (step S5). In step S4, the polarity of magnetic portion 7 is switched to generate magnetic flux in a direction opposite the direction of magnetic flux Φ1 generated at primary coil 2.

The magnetic flux Φ2 passes through magnetic-substance layer 5. Accordingly, magnetic flux Φ2 becomes a magnetic bias of magnetic-substance layer 5, and the saturated magnetic flux of magnetic-substance layer 5 changes (step S6). The magnetic flux Φ2 is generated in the direction opposite the direction of the magnetic flux Φ1 generated at primary coil 2, and thus the saturated magnetic flux of magnetic-substance layer 5 is larger. As a result, no magnetic saturation is generated at magnetic-substance layer 5 by the magnetic flux Φ1.

The magnetic flux Φ2 penetrates the arbitrary surface of secondary coil 4 surrounded with the conductor. When the magnetic pole of magnet portion 7 is switched, the magnitude of the magnetic flux Φ2 put through secondary coil 4 also changes, thus affecting the induced electromotive force of secondary coil 4. After the magnetic pole of magnet portion 7 has been switched, the magnitude of magnetic flux Φ2 put through secondary coil 4 is constant. Thus, the induced electromotive force of secondary coil 4 is not affected.

While the AC current is supplied to primary coil 2, an induced electromagnetic force is generated at secondary coil 4, and battery pack 6 is charged by the induced electromagnetic force.

Charger 1 or portable electronic device 3 includes determination means for determining whether the charging of battery pack 6 has been completed. After step S6, the determination means determines whether the charging of battery pack 6 has been completed (step S7). When the determination means determines that the charging of battery pack 6 has been completed, the supplying of the current to primary coil 2 is stopped, and the operation of the non-contact power transmission device is ended.

When the determination means determines that the charging of battery pack 6 has been not completed, the supplying of the current to primary coil 2 is continued. Then, the direction of the current supplied to primary coil 2 is reversed, and the direction of magnetic flux Φ1 generated at primary coil 2 is also reversed. Magnetic pole switching unit 8 detects the reversal of the direction of magnetic flux Φ1 generated at primary coil 2 (step S3), and switches the magnetic pole of magnet portion 7 (step S4).

Thus, magnetic pole switching unit 8 switches the magnetic pole of magnet portion 7 according to the direction of magnetic flux Φ1 generated at primary coil 2. In other words, the direction of the magnetic bias applied to magnetic-substance layer 5 is switched. Thus, the saturated magnetic flux density Bmax of magnetic-substance layer 5 can be increased corresponding to the direction of magnetic flux Φ1, and magnetic saturation at magnetic-substance layer 5 can be prevented.

The induced electromotive forces generated at the secondary coils will be compared with each other between the non-contact power transmission apparatus according to the exemplary embodiment and the related non-contact power transmission apparatus. The induced electromotive force generated at the secondary coil is AC. However, when battery pack 6 is charged, the flow of the induced electromotive force is rectified by, for example, a rectification circuit, so that the flowing direction of the current can be constant. Thus, power transmission efficiency will be compared based on the absolute values of the induced electromotive forces.

Figure 10:
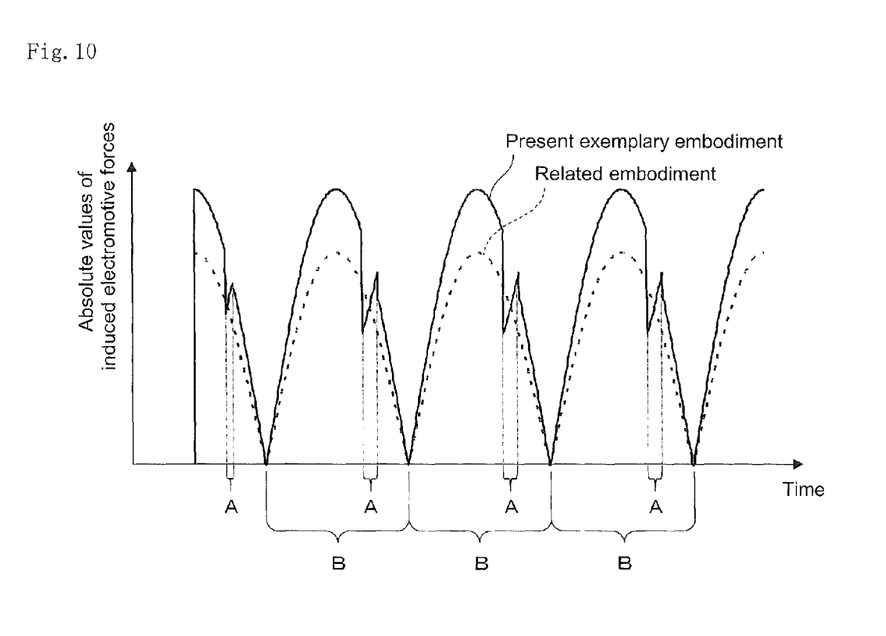
FIG. 10 is a graph showing changes with time of the absolute values of induced electromotive forces generated at the secondary coils of the non-contact power transmission apparatus according to the exemplary embodiment and the related technology.

FIG. 10 is a graph showing changes with time of the absolute values of induced electromotive forces generated at secondary coils 4. In FIG. 10, a solid line indicates the case of the non-contact power transmission apparatus according to the exemplary embodiment, and a chain line indicates a change with time of the absolute value of the induced electromotive force in the case of the related non-contact power transmission apparatus.

The size and the material of magnetic-substance layer 5 and the winding numbers and the materials of the primary and secondary coils in the related non-contact power transmission apparatus are similar to those of the exemplary embodiment. In the related non-contact power transmission apparatus, the magnitude of the magnetic flux $\Phi 1$ generated at primary coil 2 is set as saturated magnetic flux at magnetic-substance layer 5 in a state where no magnetic bias is applied.

The magnitude of magnetic flux $\Phi 1$ in the exemplary embodiment is larger than that of the magnetic flux $\Phi 1$ in the related case. Thus, the induced electromotive force generated at secondary coil 4 in the exemplary embodiment is larger than that generated at related secondary coil 4. In the present exemplary embodiment, when the magnetic bias is applied to magnetic-substance layer 5 (portion A shown in FIG. 10), an induced electromotive force is smaller than the related case because the magnitude of magnetic flux $\Phi 2$ of the direction opposite that of magnetic flux $\Phi 1$ changes. However, an induced electromotive force generated per period (portion B shown in FIG. 10) is larger than the related case.

Thus, according to the exemplary embodiment, even in the case of magnetic-substance layer 5 of the size equal to that of the related case, power transmission efficiency can be increased without generating any magnetic saturation at magnetic-substance layer 5. In other words, magnetic-substance layer 5 can be made thinner without reducing power transmission efficiency, and the non-contact power transmission apparatus can be made thin.

In the exemplary embodiment, magnetic-substance layer 5, magnet portion 7, and magnetic pole switching unit 8 are arranged on portable electronic device 3 side. However, magnetic-substance layer 5, magnet portion 7, and magnetic pole switching unit 8 can be arranged on charger 1 side, and charger 1 can be miniaturized and made thin.

The example where the non-contact power transmission apparatus of the present invention is applied to the combination of charger 1 and portable electronic device 3 has been described. Not limited to this, however, the non-contact power transmission apparatus of the present invention can be applied to all devices that transmit power by using electromagnetic induction.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2010-207822, filed Sep. 16, 2010, the disclosure of which is incorporated herein in its entirety by reference.

2 Primary coil
4 Secondary coil
5 Magnetic-substance layer
7 Magnet portion
8 Magnetic pole switching unit
$\Phi 1$, $\Phi 2$ Magnetic flux

The invention claimed is:

1. A non-contact power transmission apparatus comprising:
   a primary coil generating a magnetic flux;
   a secondary coil disposed facing the primary coil to receive power in a non-contact manner from the primary coil by electromagnetic induction so that a magnetic flux of the primary coil can pass through the coil;
   a magnetic-substance layer disposed to cover a side opposite a side of the secondary coil facing the primary coil so that the magnetic flux of the primary coil that passed through the secondary coil can pass;
   a magnet portion disposed to be able to switch two magnetic poles and configured to generate a magnetic flux that is larger than a difference between the maximum value of the first magnetic flux generated at the primary coil and the saturated magnetic flux of the magnetic-substance layer and that passes through the magnetic-substance layer in a direction in which the magnetic-substance layer spreads; and
   a magnetic pole switching unit that detects a direction of the first magnetic flux generated at the primary coil, and switches a magnetic pole of the magnet portion to generate a magnetic flux in a direction opposite the direction of the magnetic flux.

2. The non-contact power transmission apparatus according to claim 1, wherein:
   the magnetic pole switching unit includes an electromagnet to switch the magnetic pole of the magnet portion by applying a magnetic force to the magnet portion;
   the magnet portion is made of a resin material containing a powdered magnet; and
   the resin material has enough viscosity to keep the magnet in a static state when no magnetic force is received from the magnetic pole switching unit, and rotate the magnet when a magnetic force is received from the magnetic pole switching unit.

3. The non-contact power transmission apparatus according to claim 2, wherein the magnetic pole switching unit includes a magnetic flux direction detection coil that detects the direction of the magnetic flux generated at the primary coil by electromagnetic induction.

4. The non-contact power transmission apparatus according to claim 1, further comprising a magnetic flux generation coil generating a magnetic flux toward the magnetic flux direction detection coil,
   wherein the magnetic flux direction detection coil and the magnetic flux generation coil are arranged in positions not to be affected by the magnetic fluxes generated by the magnet portion and the electromagnet.

* * * * *